US007823749B2

(12) United States Patent
Kelly

(10) Patent No.: US 7,823,749 B2
(45) **Date of Patent: *Nov. 2, 2010**

(54) PRODUCT POSITIONING MECHANISM FOR A VENDING MACHINE

(75) Inventor: Paul Hayward Kelly, Aiken, SC (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/181,165

(22) Filed: Jul. 28, 2008

(65) Prior Publication Data

US 2009/0045215 A1 Feb. 19, 2009

Related U.S. Application Data

(63) Continuation of application No. 10/845,178, filed on May 14, 2004, now Pat. No. 7,404,501.

(51) Int. Cl.
*B65G 59/00* (2006.01)

(52) U.S. Cl. ......................... 221/178; 221/175; 221/64; 221/204; 221/279; 312/72

(58) Field of Classification Search ................. 221/178, 221/64, 65, 67, 68, 59.2, 59.3, 72, 35, 73, 221/86, 44, 101, 175, 179, 176, 204, 205, 221/244, 242, 279; 312/72, 35, 73, 86; 211/59.2, 211/59.3
See application file for complete search history.

(56) References Cited

U.S. PATENT DOCUMENTS 1,747,387 A 2/1930 Paulson et al.
2,249,234 A 7/1941 Srodulski
3,361,505 A 1/1968 Newberry
3,361,506 A 1/1968 Newberry
3,757,998 A 9/1973 Millies et al.
3,810,560 A 5/1974 Stegeman (Continued)

FOREIGN PATENT DOCUMENTS

EP 0 926 639 A2 6/1999

(Continued)

OTHER PUBLICATIONS

Photos depicting Hershey Vending Machine employing movable product positioning bar, 1997.

*Primary Examiner*—Gene Crawford
*Assistant Examiner*—Timothy R Waggoner

(57) ABSTRACT

A positioning mechanism for a vending machine is provided to properly align product containers for vending purposes. The vending machine includes a cabinet that establishes a product storage zone, a product delivery zone and a dispensing chamber. Arranged within the product storage zone are a plurality of shelves which include dividers that separate the shelves into a plurality of product queues. Each product queue includes an dispensing mechanism that releases a selected product from the product queue for delivery to the dispensing chamber. In addition, each product queue includes a positioning mechanism to align products in the product queue. The positioning mechanism includes a support member secured to the divider and a spacer bar pivotally secured to the support member. The spacer bar automatically adjusts to a width of a product container placed in the product queue in order to assure proper alignment of the product for dispensing.

20 Claims, 6 Drawing Sheets

U.S. PATENT DOCUMENTS

| | | | | | |
|---|---|---|---|---|---|
| 3,862,704 | A | | 1/1975 | Millies et al. | |
| 4,273,253 | A | | 6/1981 | Tanaka et al. | |
| 4,363,422 | A | | 12/1982 | Boettcher | |
| 4,583,657 | A | | 4/1986 | Finn | |
| 5,176,288 | A | | 1/1993 | Craven | |
| 5,361,938 | A | | 11/1994 | Ishine | |
| 5,595,310 | A | | 1/1997 | Spamer et al. | |
| 5,713,490 | A | | 2/1998 | Oden et al. | |
| 5,878,895 | A | | 3/1999 | Springs | |
| 6,012,604 | A | | 1/2000 | Takahashi et al. | |
| 6,116,462 | A | * | 9/2000 | Takamura et al. | 221/241 |
| 6,168,047 | B1 | | 1/2001 | Takamura et al. | |
| 6,230,930 | B1 | | 5/2001 | Sorensen et al. | |
| 6,253,954 | B1 | * | 7/2001 | Yasaka | 221/93 |
| 6,273,276 | B1 | * | 8/2001 | Upton et al. | 211/59.2 |
| 6,328,180 | B1 | | 12/2001 | Sorensen et al. | |
| 6,357,606 | B1 | | 3/2002 | Henry | |
| 6,431,398 | B1 | | 8/2002 | Cook et al. | |
| 6,484,891 | B2 | | 11/2002 | Burke | |
| 6,513,677 | B1 | | 2/2003 | Sorensen et al. | |

FOREIGN PATENT DOCUMENTS

| | | | |
|---|---|---|---|
| EP | 0 991 034 | A1 | 4/2000 |
| JP | 407168974 | A | 7/1995 |
| JP | 411045371 | A | 2/1999 |
| JP | 2002-203278 | | 7/2002 |

* cited by examiner

PRODUCT POSITIONING MECHANISM FOR A VENDING MACHINE

This application is a continuation of prior U.S. patent application Ser. No. 10/845,178 filed on May 14, 2004, which issued as U.S. Pat. No. 7,404,501 on Jul. 29, 2008.

BACKGROUND OF THE INVENTION

1. Field of the Invention

The present invention pertains to the art of vending machines and, more particularly, to a product positioning mechanism used to adjust a product queue to a width of a particular product container in order to properly position the product container in the product queue.

2. Discussion of the Prior Art

Vending machines are widely used to store and dispense a large variety of products, such as beverages and other pre-packaged articles. Typically, a vending machine includes a plurality of columns or shelves for holding products in escrow until a vending operation is initiated. In vending machines that utilize shelves, the product is typically supported upon a surface having a gradual slope that guides the product toward a release mechanism. The release mechanism is employed to direct the product toward a dispensing portion of the machine. Most vending machines arrange the products in discrete product queues, with each of the product queues being provided with an associated release mechanism. In order for the release mechanism to properly dispense products without becoming jammed or otherwise failing to dispense a selected product, the products must be properly aligned in the product queue.

Product containers come in a wide array of sizes and shapes. If a fixed alignment mechanism is employed, a given vending machine could only be used with particularly sized product containers. In recognition of this problem, vending machines are typically provided with various types of spacing units or shims in order to enable different sized product containers to be accommodated in a given queue. Depending upon the size of a given product container, shims can be added, removed or otherwise positioned to achieve a desired alignment. Although effective, modifying each product queue to accommodate a particular product line or altering the product queue in order to dispense different products can be both tedious and time consuming.

An example of another arrangement can be found in U.S. Pat. No. 6,513,677 which discloses an apparatus and method for vending products in a vending machine. The vending machine includes a number of trays for supporting products to be dispensed. In order to align the products in one of the trays, a removable wall member, having a longitudinally projecting rib, is positioned on a side wall of the tray. Depending on the size of the rib, the tray can be effectively used to dispense a particularly sized product container. However, with this arrangement, the wide array of product container sizes available in today's market mandates that a corresponding wide variety of rails be available. Moreover, as product containers change over time, the need arises to store, retain and develop different sized rails to accommodate new containers.

Therefore, despite the existence of spacing and alignment mechanisms in the prior art, there still exists a need for a substantially universal product alignment mechanism for a vending machine. More specifically, there exists a need for a product alignment mechanism that can automatically adjust to accommodate product containers of various widths.

SUMMARY OF THE INVENTION

The present invention is directed to an alignment mechanism for a vending machine that properly positions product containers for a vending operation. The vending machine includes a cabinet that houses a product storage zone, a product delivery zone and a dispensing chamber. Arranged within the product storage zone are a plurality of shelves incorporating dividers that separate each shelf into a plurality of product queues. In a preferred embodiment, each shelf is gradually sloped so as to cause the product containers to gravitate toward a forward portion of the vending machine. Each product queue includes a dispensing or escapement mechanism that, upon selection of a particular product, enables the selected product to be delivered from the product queue to the dispensing chamber.

The vending machine of the invention includes a product alignment or positioning mechanism employed within each of the plurality of product queues. In accordance with a preferred form of the invention, the product positioning mechanism includes a support member that is mounted to the divider and a spacer bar shiftably attached to the support member. Specifically, the spacer bar is spring biased and extends longitudinally within the product queue. More specifically, a spring urges the spacer bar away from the support member to automatically adjust a width of the product queue. In this manner, the product queue will automatically re-size to accommodate different sized product containers. With this arrangement, the product containers are properly aligned before reaching the dispensing mechanism.

In accordance with the most preferred form of the present invention, the support bar includes first and second end portions separated by an intermediate portion. At least one of the first and second end portions is provided with a clip element designed to secure the support member to the divider. More specifically, the support member is secured in such a manner so that the intermediate portion is nested within the divider. Preferably, the divider is constituted by a wire frame. In further accordance with the most preferred form of the invention, the product positioning mechanism includes a pair of hinges that secure the spacer bar to the support member. Preferably, at least one of the pair of hinges carries the spring that biases the spacer bar toward the product containers.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
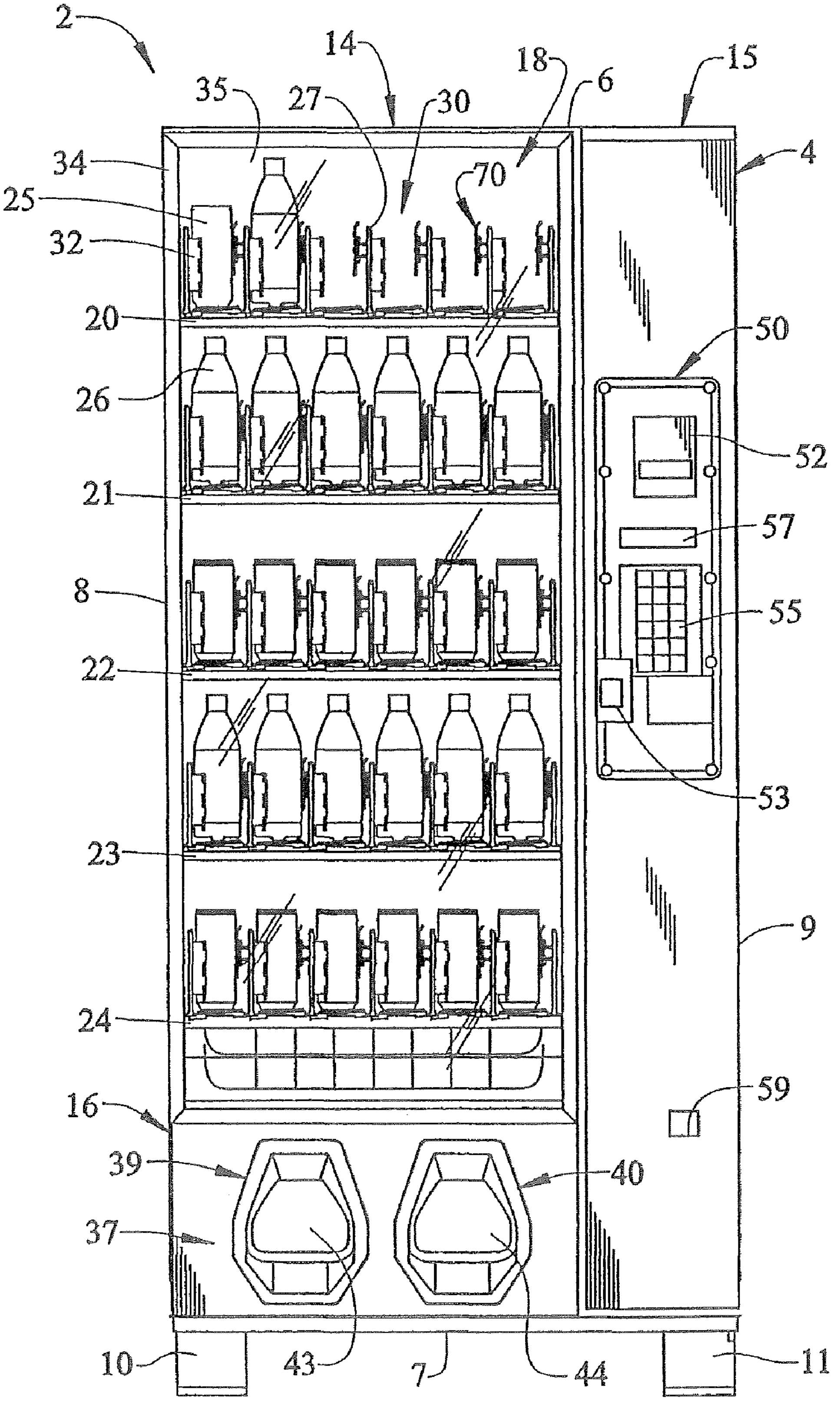
FIG. 1 is a front elevational view of a vending machine including a product positioning mechanism constructed in accordance with the present invention.
Figure 2:
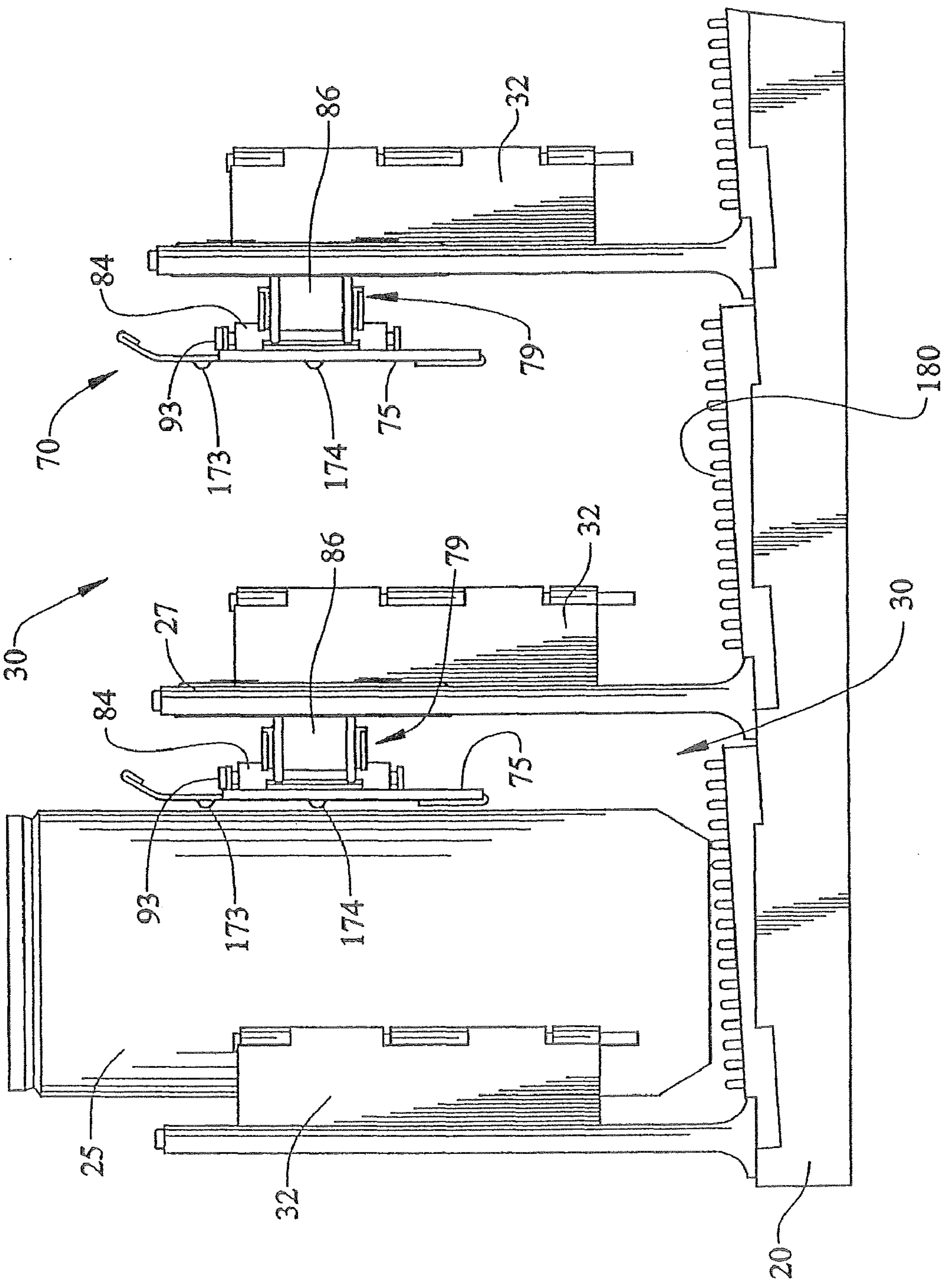
FIG. 2 is a partial, front elevational view of a product support shelf incorporating the product positioning mechanism constructed in accordance with the present invention.

With initial reference to FIG. 1, a vending machine, generally indicated at 2, includes a cabinet frame 4. As shown, cabinet frame 4 includes top, bottom and opposing side walls 6-9. Arranged below bottom wall 7 are a pair of leg members 10 and 11 for positioning vending machine 2 upon a supporting surface (not shown). In the embodiment shown, vending machine 2 is divided into a plurality of zones for performing various functions associated with the delivery of products to a consumer. Toward that end, vending machine 2 includes a storage/display zone 14, a currency receiving zone 15 and a dispensing zone 16.

In the embodiment shown, storage/display zone 14 is provided with a plurality of product support shelves 20-24 for supporting and displaying a plurality of product containers, two of which are indicated at 25 and 26. Each of the plurality of product support shelves 20-24 includes a plurality of divider walls, one of which is indicted at 27. In accordance with the invention, divider walls 27 separate product support shelves 20-24 into a plurality of product queues 30. Additionally, each of the plurality of product support shelves 20-24 includes an associated plurality of dispensing or escapement mechanisms 32. In a manner known in the art, each dispensing mechanism 32 releases a respective product container 25, 26 from storage/display zone 14 to dispensing zone 16. The actual construction and operation of dispensing mechanism 32 does not constitute part of the present invention. Instead, various known dispensing mechanisms could be employed, including that set forth in detail in commonly owned U.S. Pat. No. 6,571,988 entitled “Dispensing mechanism For a Vending Machine” issued on Jun. 3, 2003. In a manner also known in the art, storage/display zone 14 is provided with a door 34 having a glass panel 35 to enable stocking of product queues 30 and to allow a consumer to view the variety of product containers 26 arranged in the plurality of product queues 30 in order to select a desired product for dispensing.

In further accordance with the embodiment shown, dispensing zone 16 is arranged below storage and display zone 14 and includes a dispensing chamber 37. In a manner known in the art, dispensing chamber 37 is provided with a plurality of product access openings 39 and 40 that enable the consumer to remove a dispensed product container 26 from dispensing chamber 37. Product access openings 39 and 40 are provided with delivery doors 43 and 44 respectively, which are pivotally mounted to dispensing chamber 37 so as to be shiftable between a first position, effectively closing off a respective product access opening 39, 40, and a second position, enabling the retrieval of a dispensed product container 26 from dispensing chamber 37.

Arranged alongside storage/display zone 14 and dispensing zone 16 is currency receiving zone 15. In the embodiment shown, currency receiving zone 15 includes a currency receiving center 50 for inputting and storing currency deposited by the consumer during a vend transaction. Currency receiving center 50 includes a bill acceptor/validator 52, a multi-price coin mechanism 53 and a key pad 55 for inputting particular product selections. Currency receiving center 50 also includes a display 57 for providing information to the consumer, as well as validating a particular selection made. Finally, a coin return slot 59 is provided for returning any required change to the consumer at the completion of a vend operation. In general, the structure described above is provided for the sake of completeness and to enable a better understanding of the overall invention. The present invention is particularly directed to a product positioning mechanism 70 that is employed to properly align product containers 25 and 26 at dispensing mechanism 32.

As best shown in FIGS. 2-5, product positioning mechanism 70 includes a support member 74 (FIGS. 3-5), which is mounted to one of the plurality of divider walls 27, and a product positioning or spacer bar 75. In accordance with the invention, spacer bar 75 is pivotally mounted for movement relative to support member 74 so as to define an overall width of product queue 30 based upon the width of a particular product container 25, 26 placed on, for example, product support shelf 20. As depicted, support member 74 and spacer bar 75 are linked through a pair of hinge members 79 and 80 so that spacer bar 75 can pivot away from support member 74 and abut a respective product container 25, 26.

Figure 3:
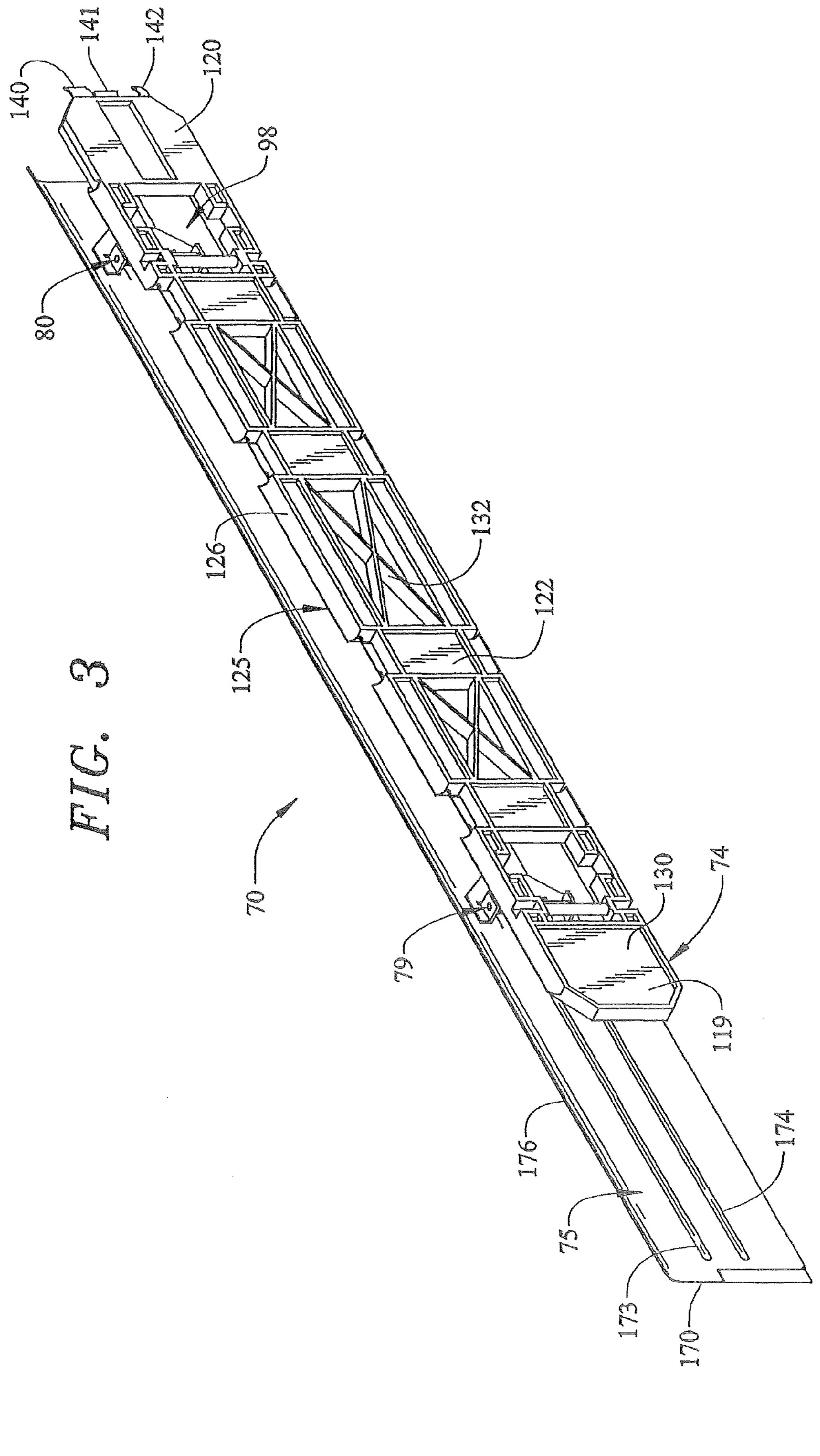
FIG. 3 is an upper right perspective view of the product positioning mechanism of the present invention.
Figure 4:
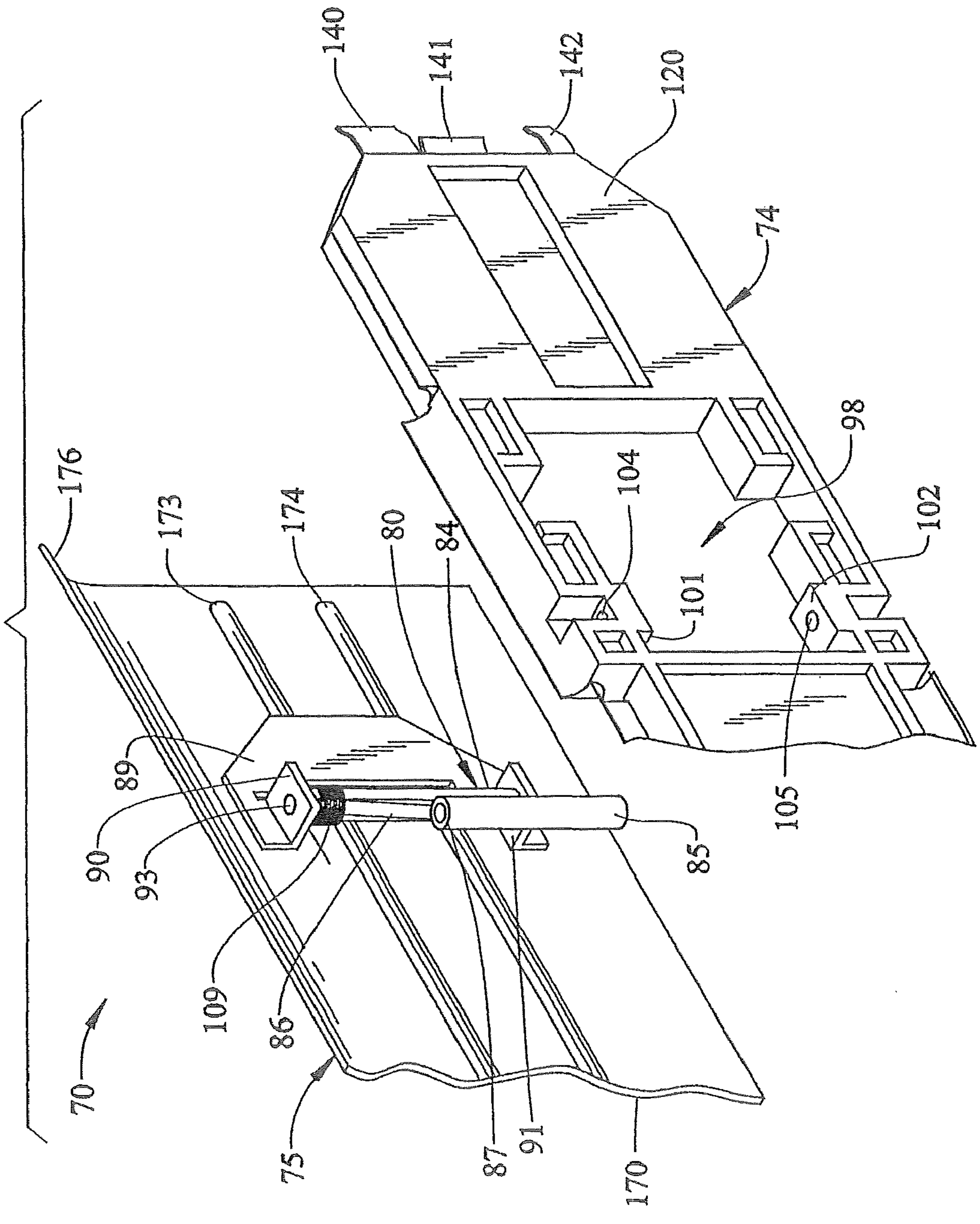
FIG. 4 is a partial, exploded view of a hinge portion of the product positioning mechanism of FIG. 3.
Figure 5A:
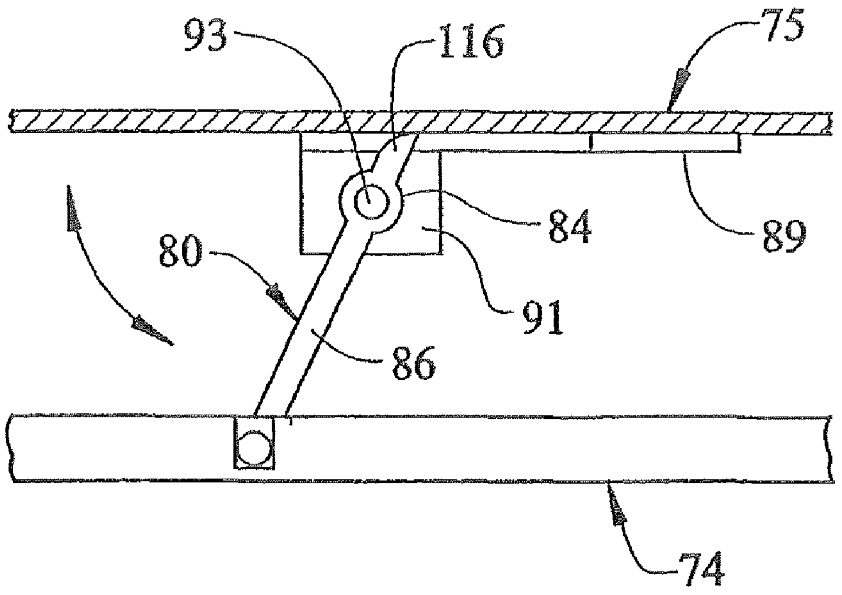
FIG. 5A is a partial, top view of the product positioning mechanism constructed in accordance with the present invention illustrating a spacer bar in an extended position.
Figure 5B:
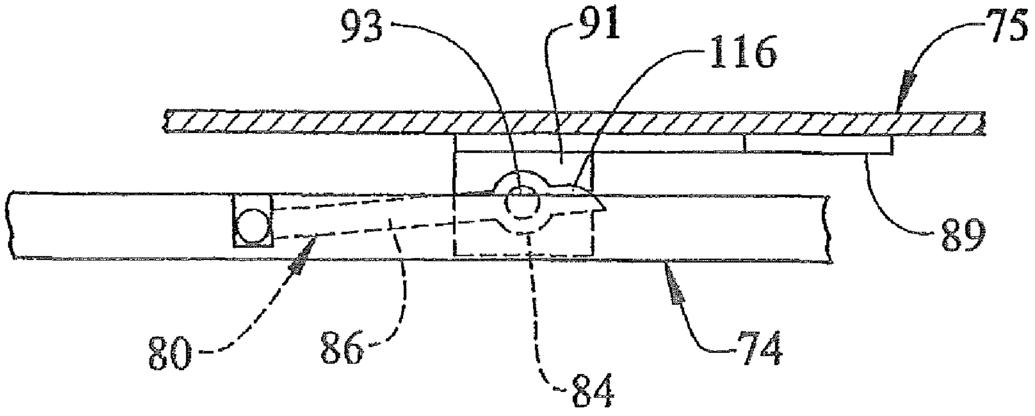
FIG. 5B is a partial, top view of the product positioning mechanism constructed in accordance with the present invention illustrating the spacer bar in a retracted position.
Figure 6:
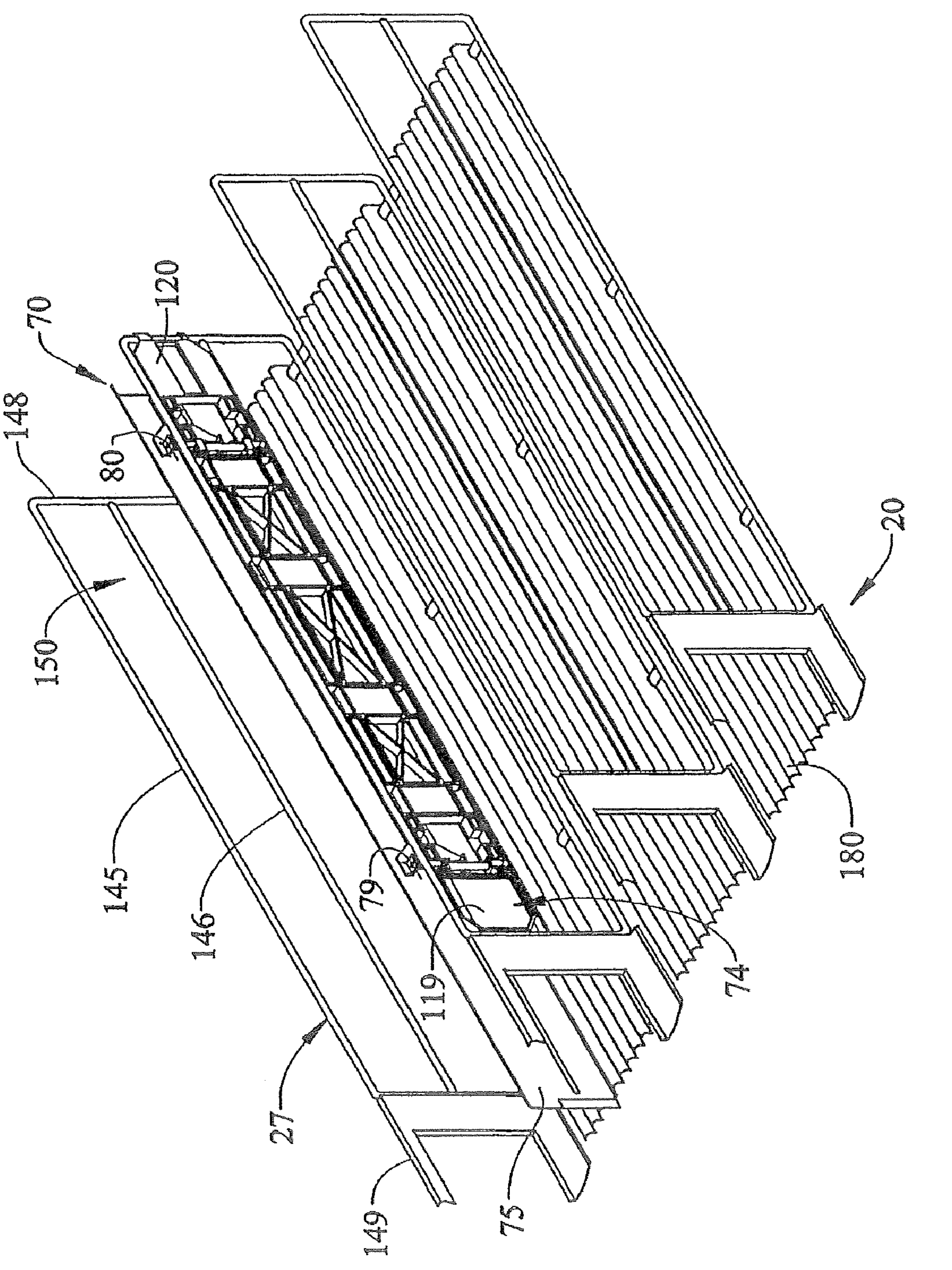
FIG. 6 is an upper right perspective view of the product positioning mechanism shown mounted to a divider wall separating adjacent product queues.

As best shown in FIGS. 3 and 4, each hinge member 79, 80 includes a pair of pivot elements 84 and 85 that are joined through an intermediate section 86. Preferably, each pivot element 84, 85 is provided with a central passage, such as indicated at 87 in FIG. 4, for receiving a fastener, preferably in the form of a pivot pin 93, that connects hinge member 79, 80 to a respective one of support member 74 and spacer bar 75. Pivot element 84 is actually shown to be secured to spacer bar 75 through a mounting bracket 89. Mounting bracket 89 is provided with a pair of opposing ear elements 90 and 91 which are spaced from one another so as to receive pivot element 84. At this point, it should be noted that, while mounting bracket 89 is shown as a separate piece, opposing ear elements 90, 91 could be integrally formed with spacer bar 75. Pin 93 is inserted through ear 90, into passage 87 and through opposing ear 91 in a manner that enables pivot element 84 to move freely. Similarly, pivot element 85 is secured in an opening 98 provided in support member 74. Opening 98 includes a pair of opposing lands 101 and 102 that are provided with corresponding openings 104 and 105.

In a manner similar to that described above, pivot element 85 is placed between lands 101 and 102 and thereafter a pin or other fastening device (not shown) is inserted through opening 104 down through first element 85 and into opening 105 in a manner that enables pivot element 85 to move freely. In accordance with a most preferred form of the present invention, at least one of pivot elements 84 and 85 is provided with a return spring 109 that causes spacer bar 75 to be biased away from support member 74. However, to prevent over-travel, each hinge member 79, 80 is provided with a flap or stop member 116 (see FIGS. 5A and 5B). Preferably, an associated stop member 116 is integrally formed as part of each pivot element 84.

In further accordance with the invention, support member 74 includes a first end 119 that extends to a second end 120 through an intermediate section 122. As best shown in FIG. 3, first end 119, second end 120 and intermediate section 122 collectively define an outer peripheral edge 125 that is mounted within divider wall 27. As will be detailed more fully below, upper and lower edge portions (not separately labeled) of peripheral edge 125 are provided with semicircular grooves 126. In the embodiment shown, intermediate section 122 includes a plurality of solid regions, such as indicated at 130, and a plurality of open frame sections, such as indicated at 132. Solid regions 140 and open frame section 132 combine to provide the overall structural support needed to position spacer bar 75 in product queue 30. In this manner, intermediate section 122 can be formed using a minimal amount of material, such as plastic, in the overall manufacturing process. In any event, in order to provide a more solid engagement between support member 74 and divider wall 27, at least one of first and second ends 119, 120 is provided with a plurality of clips 140-142.

In the example shown, clips 140-142 extend from second end 120. In accordance with the invention, divider wall 27 is formed from a plurality of fore-to-aft extending rails 145 and 146, a rear, vertical rail 148 and a front section 149, all of which collectively define an opening 150. Moreover, front section 149 is constructed so as to support dispensing mechanism 32. In any event, with this overall arrangement, clips 140-142 at second end 120 engage with rear, vertical rail 148, followed by each semi-circular groove 126 being positioned to receive a respective rail 145, 146, to position support member 74 within opening 150. At this point, it should be understood that once support member 74 is mounted within opening 150, spacer bar 75 is urged outward against product container(s) 25, 26 arranged within a given product queue 30. Toward that end, spacer bar 75 includes a vertical surface 170 having a plurality of fore-to-aft extending ribs 173 and 174 and a curved upper edge 176. Ribs 173 and 174 are provided to advantageously minimize or limit the contact area between spacer bar 75 and product(s) in queue 30, thereby enhancing the ability of the product(s) to slide within queue 30. Preferably, spacer bar 75 is pressed from a sheet of metal, e.g., aluminum or light gauge steel.

In accordance with the most preferred form of the present invention, each product support shelf 20-24 includes a supporting surface 180 (FIG. 3) that has a gradual, downward and forward slope that causes product container(s) 25, 26 to be urged forward toward dispensing mechanism 32. In order for product container(s) 25, 26 to be maintained in a preferred alignment, spacer bar 75 is biased so as to shift into product queue 30 urging product container(s) 25, 26 against an opposing divider wall 27. With this particular arrangement, product container(s) 25, 26 moving toward dispensing mechanism 32 are properly positioned or aligned so that, upon selection of a particular container 25 or 26, dispensing mechanism 32 functions without causing a mis-vend condition. It should also be apparent from the drawings that product positioning mechanism 70 automatically adjusts to a particular width of a product container 26. That is, due to the presence of spring 109, as well as hinges 79 and 80, spacer bar 75 automatically repositions to contact the outer surface of the product container regardless as to size. That is, if the product container 25, 26 is narrow, spacer bar 75 will move further away from, while remaining substantially parallel to, support member 74, with the relative movement being limited by stop member 116. If the product container 25, 26 is wide, spacer bar 75 will not be required to move much at all. In any event, product positioning mechanism 70 essentially functions as an automatically adjustable shim.

Although described with reference to a preferred embodiment of the present invention, it should be readily apparent to one of ordinary skill in the art that various changes and/or modifications can be made to the invention without departing from the spirit thereof. For instance, while the spacer bar is shown mounted to the divider through a support member, the spacer bar could be directly attached to, for example, a solid divider, i.e., the support member constitutes the divider. In general, the invention is only intended to be limited by the scope of the following claims.

I claim:

1. A vending machine including a product support shelf adapted to store a plurality of products in a queue between a first divider and a second divider, wherein the first divider comprises:

an open structure;

a support member, a portion of which is positioned within the open structure, the support member comprising a clip element adapted to couple the support member to the open structure;

a spacer bar;

and a biasing mechanism adapted to couple the spacer bar to the support member and urge the spacer bar away from the first divider and automatically position the plurality of products in the queue adjacent to the second divider.

2. The vending machine of claim 1, wherein the open structure is formed from a plurality of wire elements that define the boundary of the open structure.

3. The vending machine of claim 2, wherein the support member comprises a semi-circular groove adapted to receive one wire structure of the plurality of wire structures.

4. The vending machine of claim 1, wherein the biasing mechanism comprises a hinge member coupling the spacer bar to the first divider.

5. The vending machine of claim 4, wherein the hinge member comprises a stop member adapted to limit relative movement between the spacer bar and the first divider.

6. The vending machine of claim 5, wherein the biasing mechanism further comprises a spring element adapted to bias the spacer bar away from the first divider.

7. The vending machine of claim 1, wherein the spacer bar comprises ribs adapted to minimize a contact area between the spacer bar and the plurality of products in the queue.

8. The vending machine of claim 1, wherein the support member includes a peripheral edge, and a portion of the peripheral edge of the support member is adapted to receive a corresponding portion of the divider.

9. The vending machine of claim 1, wherein substantially all of the support member is positioned within the open structure.

10. The vending machine of claim 1, wherein the support member snap-fittingly engages the divider.

11. A vending machine including a product support shelf adapted to store a first plurality of products in a first queue between a first divider and a second divider, wherein:

the first divider comprises:

an open structure;

a support member, a portion of which is positioned within the open structure, the support member comprising a clip element adapted to couple the support member to the open structure;

a first spacer bar;

and a first biasing mechanism adapted to couple the first spacer bar to the support member and urge the first spacer bar away from the first divider and automatically position the first plurality of products in the first queue adjacent to the second divider; and the second divider comprises an escapement mechanism adapted to release a first product of the first plurality of products in the first queue.

12. The vending machine of claim 11, wherein:

the product support shelf is further adapted to store a second plurality of products in a second queue between the second diver and a third divider; and the second divider further comprises a second spacer bar and a second biasing mechanism adapted to urge the second spacer bar away from the second divider and automatically position the second plurality of products in the second queue adjacent to the third divider.

13. The vending machine of claim 12, wherein the second divider further comprises a support member and the second biasing mechanism couples the second spacer bar to the support member.

14. The vending machine of claim 13, wherein the second divider further comprises an open structure and wherein a portion of the support member is positioned within the open structure.

15. The vending machine of claim 14, wherein the open structure is formed from a plurality of wire elements that define the boundary of the open structure and the support member comprises a semi-circular groove adapted to receive one wire structure of the plurality of wire structures.

16. The vending machine of claim 14, wherein the support member comprises a clip element adapted to couple the support member to the open structure.

17. The vending machine of claim 12, wherein the second biasing mechanism comprises a hinge member coupling the second spacer bar to the second divider.

18. The vending machine of claim 17, wherein the hinge member comprises a stop member adapted to limit relative movement between the second spacer bar and the second divider.

19. The vending machine of claim 18, wherein the second biasing mechanism further comprises a spring element adapted to bias the second spacer bar away from the second divider.

20. The vending machine of claim 12, wherein the second spacer bar comprises ribs adapted to minimize a contact area between the second spacer bar and the second plurality of products in the second queue.

* * * * *